United States Patent
Holtermann et al.

(12)

(10) Patent No.: US 6,190,539 B1
(45) Date of Patent: *Feb. 20, 2001

(54) REFORMING USING A BOUND HALIDED ZEOLITE CATALYST

(75) Inventors: Dennis L. Holtermann, Crockett; Charles R. Wilson, San Francisco; Wayne S. Masumura, Berkeley, all of CA (US); Michio Sugimoto; Hiroshi Ohashi, both of Chiba (JP)

(73) Assignee: Chevron Chemical Company LLC, San Ramon, CA (US)

( * ) Notice: Under 35 U.S.C. 154(b), the term of this patent shall be extended for 0 days.

This patent is subject to a terminal disclaimer.

(21) Appl. No.: 09/200,053

(22) Filed: Nov. 24, 1998

Related U.S. Application Data (63) Continuation-in-part of application No. 09/004,216, filed on Jan. 8, 1998.

(51) Int. Cl.[7] .................................................. C10G 35/06
(52) U.S. Cl. .................. 208/139; 208/137; 208/138; 208/135; 585/418; 585/419
(58) Field of Search ...................... 208/137, 138, 208/139, 135; 585/419, 418

(56) References Cited

U.S. PATENT DOCUMENTS 5,472,593 * 12/1995 Gosling et al. ........................ 208/65
5,633,422 * 5/1997 Murray ................................ 585/671

* cited by examiner

Primary Examiner—Benjamin L. Utech
Assistant Examiner—Nadine Preisch
(74) Attorney, Agent, or Firm—David M. Tuck (57) ABSTRACT

A catalytic reforming process comprising the catalytic conversion of hydrocarbons to aromatics, said process comprising treating a halided zeolite catalyst (hiz-cat) containing a Group VIII metal at commercial startup conditions and then reforming hydrocarbons, wherein said catalyst is prepared by washing a bound zeolite catalyst base or a bound zeolite catalyst before halide addition. A preferred hiz-cat is a non-acidic Pt K L-zeolite catalyst prepared by a process that includes the steps of preparing a calcined silica-bound K L-zeolite catalyst base; washing said bound zeolite catalyst base with a liquid comprising water; and incorporating Pt and halogen-containing compound(s) comprising chlorine and fluorine into said washed catalyst base. Ammonium chloride and ammonium fluoride are preferred halide sources.

21 Claims, 2 Drawing Sheets

REFORMING USING A BOUND HALIDED ZEOLITE CATALYST

RELATED PATENT APPLICATIONS

This application is a continuation-in-part of U.S. Ser. No. 09/004,216, filed Jan. 8, 1998, which is incorporated herein by reference in its entirety.

FIELD OF THE INVENTION

The present invention relates to improved hydrocarbon conversion processes using bound and washed, halided zeolite catalysts. In a preferred embodiment the invention relates to catalytic reforming with a bound and washed, halided Pt L-zeolite catalyst. More specifically, the invention relates to the discovery and control of catalyst cycle length problems that are associated with commercial startup of halided zeolite catalysts containing Group VIII metals.

BACKGROUND

The advantages of monofunctional non-acidic platinum L-zeolite catalysts for catalytic reforming were discovered in the late 1970's. U.S. Pat. No. 4,104,320 to Bernard and Nury discloses that it is possible to dehydrocyclize paraffins to produce aromatics with high selectivity using a monofunctional non-acidic L-zeolite catalyst. This L-zeolite catalyst has exchangeable cations of which at least 90% are sodium, lithium, potassium, rubidium or cesium, and contains at least one Group VIII noble metal or tin or germanium.

Later, Buss and Hughes developed improved L-zeolite catalysts for reforming petroleum naphthas. These catalysts comprise a large pore zeolite exchanged with an alkaline earth metal containing one or more Group VIII metals (preferably platinum). See U.S. Pat. Nos. 4,434,311; 4,435,283; 4,447,316, and 4,517,306. Barium exchanged catalysts were found to provide even higher selectivities than the corresponding alkali exchanged L-zeolite catalysts disclosed in U.S. Pat. No. 4,104,320. The high selectivity catalysts of Bernard and Nury, and of Buss and Hughes, are all "non-acidic" and are referred to herein as "monofunctional catalysts". These catalysts are highly selective for forming aromatics via dehydrocyclization of paraffins.

After more than 10 years of extensive research and engineering, the use of L!zeolite catalysts for reforming was commercialized. This commercialization required many additional discoveries. Two key discoveries were the criticality of ultra-low sulfur levels in the feed, and the impact of these ultra-low sulfur levels on reactor metallurgy, i.e., the discovery of the need to prevent coking, carburization and metal dusting.

While commercialization of ultra-low sulfur reforming was being pursued, a second generation of platinum L-zeolite catalysts was being developed. These new catalysts (referred to herein generically as "hiz-cats") are produced by treating L-zeolites with halogen-containing compounds, such as halocarbons (e.g., U.S. Pat. No. 5,091,351 to Murakawa et al.) or ammonium salts, (e.g., EP 498,182A and U.S. Pat. No. 5,354,933 to Ohashi et al.) and Group VIII metals. It is disclosed that these halided catalysts are useful for preparing aromatic hydrocarbons such as benzene, toluene and xylenes from $C_6$–$C_8$ aliphatic hydrocarbons in high yield. They allow operations at high severity, tolerate a wide range of hydrocarbon feeds, and show high activity and long life in screening studies. Other patents that disclose hiz-cats include U.S. Pat. No. 4,681,865, U.S. Pat. No. 4,761,512 and U.S. Pat. No. 5,073,652 to Katsuno et al.; and U.S. Pat. No. 5,196,631 and U.S. Pat. No. 5,260,238 to Murakawa et al.

Yet, our attempts to commercialize one of these hiz-cats resulted in a catalyst with poor performance. When the patented recipe for preparing a bound halided L-zeolite catalysts was followed, we discovered that the resulting catalyst was unexpectedly sensitive to reforming startup conditions. The catalyst performed well in screening studies using high gas velocity, rapid heat rate, "laboratory" startup (LSU) conditions; but surprisingly, its fouling rate was unacceptably high when low velocity, simulated "commercial" startup (SCSU) conditions were employed.

Scale-up and commercialization of a new process, particularly one using a new catalyst, entail numerous changes from laboratory procedures. For instance, limitations due to commercial equipment impact scale-up designs and the way commercial processes are operated. For example, commercial gas compressors set limits on gas flow rates, and heat transfer limitations influence reactor configurations, designs, and operating conditions. Moreover, laboratory studies are generally done to get results in a reasonable time frame, while commercial operations are intended to operate for much longer times. One example of unpredictability in the process scale-up area is Heyse et al., as described in U.S. Pat. No. 5, 675,376. Here, potentially catastrophic carburization and metal dusting problems were only first observed when low sulfur reforming was being tested in commercial reforming equipment. The metallurgy, process configuration, and temperature of commercial reforming operations lead to coke plugging problems not observed in laboratory studies.

Commercialization and scale-up also requires working with quantities of materials that are 100 to 1,000,000 times larger than used in laboratory studies. This increased scale typically requires that catalyst preparation procedures be modified. A process as simple as drying is done quite differently in the laboratory than at a commercial plant. Often, these scale differences do not significantly affect catalyst performance, but occasionally they do.

Furthermore, the catalyst composition is often modified to meet the demands of commercial operations, e.g. to attain needed crush strength. Also, (unbound) zeolite crystals or powders are often used in laboratory studies. In contrast, bound zeolites are usually used in commercial operations. This is because bound zeolites reduce the pressure drop through large reactor, provide improved gas and liquid flow rates, and are easier to load and unload. Yet it is known that the performance of bound catalysts, especially bound zeolites, can be quite different from that of unbound powders. Sometimes, the type of binder or binding method affects catalyst performance. Sometimes special steps that are only done for bound catalysts, such as calcination of the bound zeolite, affects catalyst performance.

Thus, studies on powdered zeolites do not always predict the commercial performance of bound zeolites. One example that shows the unpredictability of catalyst performance associated with adding a binder is Mohr et al., in U.S. Pat. No. 5,106,803. Mohr et al., disclose the criticality of the water sensitivity index of a bound L-zeolite catalyst. This property was not observed to be important for the unbound catalyst.

Yet one must assume that scale-up will proceed satisfactorily, since it is not possible to predict what factors will be critical for a particular new process or new catalyst. For halided zeolite catalysts, there is no suggestion in the art that there might be problems associated with preparing bound catalysts or with the use of these catalysts in commercial operations, particularly problems related to catalyst startup procedures. Indeed, there is nothing in the art that teaches the importance of washing or otherwise treating a catalyst base (i.e., a bound zeolite) or a bound zeolite catalyst before adding halide, as described hereinbelow.

Treating conventional, non-halided zeolites—including L-zeolite—with water or an aqueous solution is known. For example, Kao et al., in U.S. Pat. No. 4,987,109 adjust the pH of L-zeolite crystals by washing them so as to provide a zeolite of pH 9.4–10.0. These washed zeolites are then bound. Washing the zeolite crystals to this pH improves catalyst activity. Also, Poeppelmeir et al., in U.S. Pat. No. 4,595,668, teach having the nobel metal of in a zeolite dispersed in particles having a diameter of less than 7 angstroms. In Example 6, they describe how to prepare a bound catalyst of their invention using an oxychlorination step. Another example is Poeppelmeir et al., in U.S. Pat. No. 4,568,656. Here a bound L-zeolite is contacted with an aqueous solution containing a Pt salt and a non-platinum salt (e.g., KCl). This mixture is aged to distribute the Pt uniformly (see Example 1.) Also, Buss and Hughes in U.S. Pat. No. 4,721,694 teach preparing platinum Ba L-zeolite catalysts using a barium ion exchange before Pt impregnation. The ion exchange replaces potassium with barium in the catalyst and is taught to improve selectivity. For example, in Col 12, they discuss treating extruded pellets by ion exchange with a barium solution, followed by Pt impregnation. These patents are all incorporated herein by reference.

It is also known to wash powdered zeolite catalysts containing halides. For instance, Tatsumi et al., have done laboratory studies investigating powdered, unbound Pt K L-zeolite catalysts for aromatization of hexane. They have looked at the effect of adding KCl and the addition method on catalyst perfonnance [*Chem. Lett.*, 387–390 (1993); *J. Cal.* 147, 311–321 (1994); *Bull. Chem. Soc. Jpn.*, 67, 1553–1559 (1994); and *Cat. Lett.*, 45 (1997) 107–112]. They have also investigated the effect of other halogen anions (F, Br, I) on hexane aromatization [*Cal. Lett.*, 27 (1994) 289–295 and *Sci. & Tech. in Cat.*, 117–122, (1994)]. They report that chloride and fluoride give the best results. Tatsumi et al., typically add a potassium halide (e.g., KCl) after Pt addition. In general, these authors add halide along with alkali, i.e., then add a refractory alkali halide salt to the catalyst. (Note: these catalysts are not hiz-cats, as defined herein.) In trying to understand why KCl addition improves catalyst selectivity, the authors of the *J. Cat.*, 147 (1994) article add ammonium chloride to a powdered Pt L-zeolite catalyst that had been prepared by ion exchange (and washing). This catalyst, which is a hiz-cat, did not show the improved selectivity of catalysts with KCl added, leading the authors to discuss the importance of adding salts containing both alkali and halide.

Sugimoto et al., in *Appl. Cat. A. General* 96 (1993) 201–216, have also studied unbound catalysts. They prepared powdered hiz-cats from a variety of zeolites, including those prepared from an L-zeolite powder. These catalysts were made using a halocarbon treatment following either an alkaline soaking or ion exchange. In either case, the powdered zeolites were washed. Catalysts prepared from these washed powders were tested for n-hexane aromatization. As already noted, these studies were done on powdered catalysts, not bound catalysts.

None of the references discussed above address problems associated with commercial startup of bound halided zeolite catalysts. Nor do they teach the importance or desirability of washing bound zeolite bases or bound catalysts, especially non-acidic zeolite bases or catalysts, before adding halide as discussed hereinbelow.

DESCRIPTION OF THE INVENTION

One object of the present invention is to provide a reforming process using bound, halided zeolite catalysts (hiz-cats), especially bound, halided Pt L-zeolite catalysts, where the catalysts have long cycle lengths after commercial startup. Another object of the invention is to improve the reproducibility of catalytic operations using hiz-cats. As discussed below, we have discovered that unless the catalyst base or the bound catalyst is washed before halide addition, the catalyst will foul rapidly and have a short cycle length.

In one embodiment, the present invention is a catalytic reforming process using a bound, halided zeolite catalyst (a hiz-cat) comprising the catalytic conversion of hydrocarbons to aromatics wherein the catalyst is treated at commercial startup conditions. These commercial startup conditions include "low" gas flow rates (e.g., GHSV of between 400 and 2000 hr-1) and "slow" heat-up rates (e.g., between about 5 and 50° F./hr, and more typically at between about 10–25° F./hr) during catalyst reduction. Commercial reformer startup conditions are well known to those skilled in the art, especially in contrast with laboratory startup conditions, which are generally used in experimental studies. More particularly, the invention is directed to reforming using halogen-added or halogen-impregnated zeolite catalysts containing a Group VIII metal that have long cycle lengths and maintain very low fouling rates after commercial startup.

According to one embodiment, the invention is a catalytic reforming process comprising the catalytic conversion of hydrocarbons to aromatics, said process comprising treating a halided zeolite catalyst containing a Group VIII metal at commercial startup conditions and then reforming hydrocarbons, wherein said catalyst is prepared by washing a bound zeolite catalyst base or a bound zeolite catalyst before halide addition. Adding halide and, if not present, a catalytic metal results in a washed hiz-cat, as the term is used herein. Preferred washed hiz-cats contain both chloride and fluoride. An especially preferred hiz-cat is a bound and washed, halided Pt L-zeolite catalyst, for example a catalyst prepared with about 0.9 wt % initial chloride, 0.9 wt % initial fluoride and about I wt % added Pt.

Figure 1:
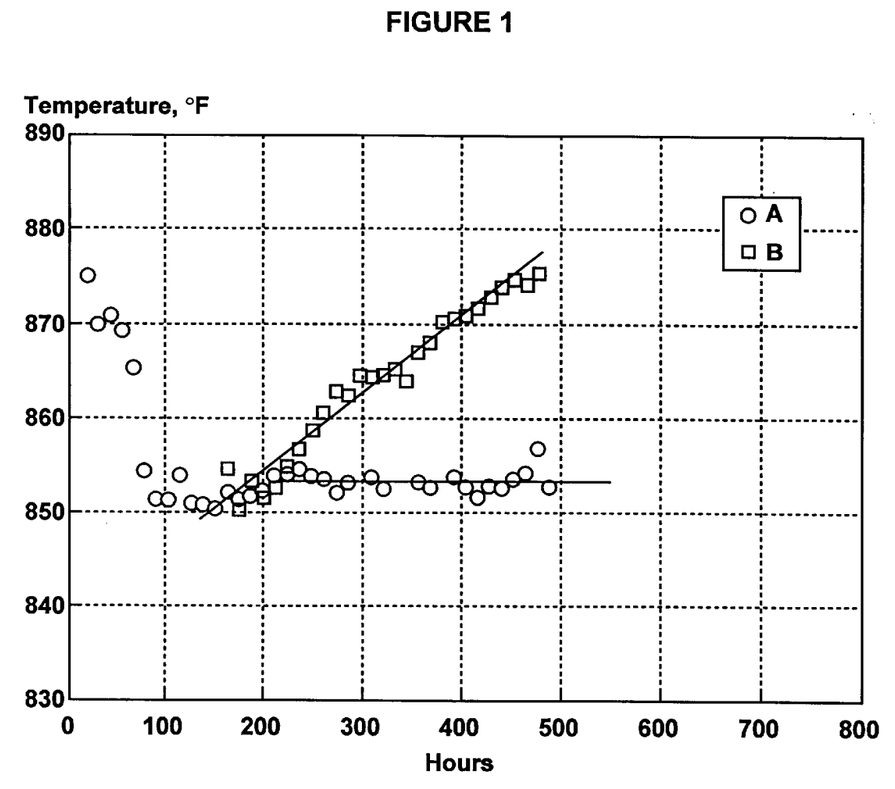
FIG. 1 compares the catalytic reforming performance of a bound halided Pt L-zeolite catalyst prepared in the manner of EP 498,182A or U.S. Pat. No. 5,354,933 after a laboratory startup procedure (curve A) and after a simulated commercial startup (SCSU) procedure (curve B).

Among other factors, the invention is based on our discovery that the reforming performance of bound hiz-cats, especially bound non-acidic, L-zeolite hiz-cats, can be very sensitive to reforming startup conditions. We have discovered that bound hiz-cats that have low fouling rates after being treated under high gas flow rate startup conditions, (e.g., conditions such as those typically used in lab testing units) do not necessarily exhibit these same low fouling rates when commercial startup conditions are used. Rather, low catalyst activity and/or rapid fouling are often observed when the bound catalyst is started up at simulated commercial startup conditions. FIG. 1 compares the catalytic reforming performance of a bound halided Pt L-zeolite catalyst prepared in the manner of EP 498,182A or U.S. Pat. No. 5,354,933 after a startup using laboratory startup (LSU) conditions (curve A) and simulated commercial startup (SCSU) conditions (curve B). As the figure shows, the impact of startup conditions on the performance of bound hiz-cats can be very large. We have unexpectedly discovered that catalyst performance following a startup at SCSU conditions can be significantly improved by washing the catalyst or catalyst base before halide addition. See FIG. 2, which compares the performance of a washed hiz-cat with a hiz-cat that has not been washed.

Hiz-cats useful in this invention can be prepared by washing the bound catalyst or preferably the catalyst base (i.e., the bound zeolite) before halogen impregnation/addition. According to one preferred embodiment, the catalyst is prepared by a process that includes binding, extruding, calcining and washing the catalyst base before halide addition. In another preferred embodiment, the hiz-cat is produced by a method that includes:

a) preparing a calcined silica-bound L-zeolite catalyst base;
b) washing said bound zeolite catalyst base with a liquid comprising water; and
c) incorporating a Group VIII metal and halogen-containing compound(s) comprising chlorine and fluorine into said washed base to produce a halided zeolite catalyst.

Preferably the washed base is calcined before step (c). Non-acidic L-zeolite is a preferred zeolite. In another embodiment of the invention, the catalyst base is ion-exchanged with potassium, wherein washing is part of the ion exchange procedure.

In yet another embodiment, the invention is a method of preparing a bound hiz-cat having a cycle length >1200 hr following startup at SCSU conditions, and the catalyst prepared thereby. According to another embodiment, the invention is also the use of a bound hiz-cat that has been washed before halide addition in a hydrocarbon conversion process, wherein the catalyst is treated at commercial startup conditions.

DETAILED DESCRIPTION OF THE INVENTION

In one broad aspect, the present invention is a process that comprises catalytic reforming using a bound halided zeolite catalyst, especially an L-zeolite catalyst comprising chloride and fluoride, which is treated at commercial startup conditions. In a preferred embodiment, the invention is a process for producing aromatics comprising preparing a halided zeolite catalyst by washing a calcined, bound zeolite catalyst base with a liquid comprising water; adding at least one halogen-containing compound and a Group VIII metal compound to said washed base; bringing said catalyst on stream using commercial startup conditions; and contacting said catalyst with paraffinic hydrocarbons at catalytic reforming conditions to produce aromatics. More preferably, the reforming process contacts a stream comprising $C_6$ and $C_7$ hydrocarbons and containing less than 50 ppb sulfur with a halided Pt K L-zeolite catalyst. The halides comprise chloride and fluoride, and said catalyst is prepared by washing a bound zeolite catalyst base before halide addition.

Although the terms "comprises" or "comprising" are used throughout this specification, these terms are intended to encompass both the terms "consisting essentially of", and "consisting of", as understood in the patent art, in various preferred aspects and embodiments of the present invention. The terms "comprises" or "comprising" themselves are terms of the patent art. They are intended to be inclusive terms. The terms thus include the specified component or components, or the specified step or steps, being discussed or claimed, as well as any additional components or steps.

As used herein, the term "bound", is intended to describe a zeolite, binder combination that is formed into aggregates such as pellets, pills, extrudates and the like. The term "catalyst base", as used herein, refers to a bound zeolite.

The term "catalyst" is used herein in a broad sense and includes the final catalyst as well as precursors of the final catalyst. Precursors of the final catalyst include, for example, the calcined form of the catalyst containing the catalytic metal and also the catalyst prior to activation by reduction. The term "catalyst" is thus used to refer to the activated catalyst in some contexts herein, and in other contexts to refer to precursor forms of the catalyst, as will be understood by skilled persons from the context. The catalysts of this invention are bound and comprise a Group VIII metal. Although often discussed herein in terms of Pt being the Group VIII metal, it is intended that this discussion is exemplary rather than limiting.

As used herein, the term "hiz-cat" is intended to include zeolite catalysts that result from addition of halogen-containing compounds to, or from halide impregnation of, zeolites, catalyst bases (i.e., bound zeolites) or zeolite catalysts (i.e., zeolites containing catalytic metal). Hiz-cats are also referred to herein as "halided catalysts" or "halided zeolite catalysts". The halides of the hiz-cats are in addition to those that may be incorporated into the catalyst from the catalytic metal source; that is, this halogen addition or impregnation is not just that associated with conventional platinum loading and impregnation, where platinum halides are often used. Nor does this halogen treatment include conventional zeolite ion exchange operations. Zeolite ion exchange sometimes uses a halide salt, such as KCl, to replace the cations in the zeolite; this ion exchange can leave small amounts of halide on the catalyst. Moreover, the term hiz-cat is not intended to include catalysts where halide is added using alkali halides (e.g., KCl) or alkaline earth halides. As is discussed hereinbelow, we believe that added alkali is detrimental to hiz-cats performance.

It is not known in what form the halide is present in hiz-cats. It may be as ionic halide, neutral halide, or it may be part of compound, such as a silica halide or Pt halide. Thus, as used herein, the term "halide" is used in a broad sense, and is not intended to denote the ionic state of the added halogen or of the halogen associated with the catalyst.

The halide of the hiz-cat can be chloride, fluoride, bromide, or iodide, or a combination thereof. In a preferred embodiment, the hiz-cat contains chloride or fluoride, more preferably both. Especially preferred hiz-cats can be prepared by treating the bound zeolite or bound catalyst with halocarbons such as freons or with other chlorine-containing and/or fluorine-containing compounds, e.g. by impregnation with ammonium chloride and ammonium fluoride. Preferred hiz-cats useful in this invention have high total halide after calcination (this includes all halides, e.g. both chloride and fluoride), i.e., they contain at least about 0.9 wt % halide, preferably at least about 1.1 wt % and more preferably at least about 1.3 wt % total combined halide. More than about 5 wt % halide does not appear to provide significant advantages. When chloride and fluoride are both present, the weight ratio of Cl to F can vary. Preferably it is between 1:10 and 10:1. More preferably chloride and fluoride are added in a weight ratio of about 1:1.

As used herein, the terms "chloride retensivity" and "retained chloride" denotes the residual chloride content of the catalyst after dry-out, reduction and about 300 hr on-stream. Hiz-cats evolve chloride during these steps, especially during reduction. Thereafter, the chloride level on the catalyst remains substantially constant as the catalyst is brought on-stream and operated. After startup, some halide does continue to evolve, but very slowly. Care should be taken not to overheat the catalyst, (i.e., temperatures above about 950° F.) since additional chloride will evolve, and this overheating is not desirable.

Based on our studies, we found that bound hiz-cats prepared in the manner of EP 498,1 82A or U.S. Pat. No. 5,354,933 gave good performance (activity and life) in LSU tests.

LSU tests use very high gas velocity (hydrogen at 10,000 GHSV) and a fast heat-up rate (I 00° F/hr). But, when this catalyst was started-up at simulated commercial gas flow and heat-up rates, (SCSU conditions), it unexpectedly exhibited an unacceptably high fouling rate and short cycle length. See FIG. 1, Curve B. Extensive variations in the simulated commercial startup did not overcome the cycle length problem. Indeed, we found that the patented recipe for making bound halicded Pt L-zeolite catalysts did not necessarily produce a catalyst suitable for long-term commercial operation using a commercial startup.

After much experimentation, we found that bound hiz-cat performance can be significantly improved by washing, e.g., with water, before halide addition. We also found that catalysts that performed well after a SCSU retained less of the added chloride than poor catalysts, even though the retained chloride, i.e. the "chloride retensivity", is independent of startup conditions. Among the many variables examined, and upon further investigation, we also discovered that the sodium content of catalysts that performed poorly was consistently, albeit by a small amount (0.5 wt % vs about 0.4 wt %), higher than that of catalysts with long cycle lengths. Moreover, sodium content seems to correlate with retained chloride.

In a preferred embodiment, calcined catalyst base is washed before adding the halogen-containing compounds and the Group VII metal, e.g., platinum. In this way, these added components are not washed out of the catalyst. It is preferred that the catalyst base is washed with one or more volumes of wash water. The washing desirably removes at least 20%, preferably at least 50%, of the readily removable alkali. Quite remarkably, after platinum and halogen impregnation, the washed catalysts of the invention are amenable to commercial startup. For example, see FIG. 2, which compares an "as prepared" bound hiz-cat made in the manner of EP 498,1 82A or U.S. Pat. No. 5,354,933 with a water-washed bound hiz-cat as described below. The washed hiz-cat shows a much lower fouling rate and an improved cycle length. We have also found that catalyst performance can be improved by some types of ion exchange processes. Cation exchange, such as with potassium and the like, often includes a wash step. When ion exchange comprises a wash step, as described in this invention, hiz-cat performance improves. Here also the wash step is preferably done on the bound catalyst base before halide(s) (and platinum) is added.

It is not known what causes the improvement in catalyst performance that is associated with washing. Washing (and the calcining, which is preferably done thereafter) results in numerous changes including the removal of Na, Si, K, S and small amounts of Al. It may be the removal of one or more of these elements or some other change that improves the catalyst performance. We have noted that reduced sodium levels seem to correlate with improved catalyst performance following a SCSU.

The bound and washed hiz-cat of the invention has a long cycle length and low fouling rate following a SCSU. The catalyst may exhibit an initial transient period of 100–300 hr, before catalyst performance lines out. Thereafter, it settles down to roughly linear fouling performance. Then, cycle length and fouling rate are measured. Preferred washed hiz-cats have a cycle length of >1200 hr, preferably >2000 hr and more preferably >4000 hr, following startup at simulated commercial startup (SCSU) conditions as described below. Catalyst fouling rates are preferably less than 0.02° F./hr after stabilization following a SCSU, more preferably less than 0.01 and most preferably less than 0.003° F./hr.

It appears that fouling rate and cycle length are related to retained chloride after startup and hydrocarbon processing. For example, we started with as-impregnated catalysts that initially contained about 0.9 wt % total chloride and about 0.9 wt % total fluoride. After calcination, these catalysts contained about 0.75 wt % chloride and about 0.75 wt % fluoride. After startup and reforming, preferred catalysts were found to contain less than about 0.5 wt % chloride, more preferably less than 0.45 wt % and most preferably less than 0.4 wt % chloride. The sodium level of these catalysts is preferably less than about 0.4 wt %.

While not wishing to be bound by theory, it is believed that halide evolution during catalyst startup, particularly HCl evolution, somehow improves hiz-cat performance. Gases, including water and ammonia, evolve from the catalyst during startup. With high-velocity lab startups, these evolving gases are only present for short periods and at low partial pressure; they are quickly removed. In contrast, during commercial startups, especially with bound catalysts, there is more time for evolved water and ammonia to contact the catalytic metal (e.g., Pt), and these gases are present at higher partial pressures. This can result in Pt migration. Thus, commercial startup conditions can lead to undesired Pt agglomerates and poor catalyst performance.

Thus, it is believed that evolving halides produced during commercial startup of bound hiz-cats help disperse or redisperse Pt, perhaps via mobile Pt or Pt halide species. Catalysts that have not been washed appear to evolve less chloride during startup, and have lower cycle lengths. It appears that for bound hiz-cats it may be necessary to evolve a threshold amount of mobile or mobilizing halide to achieve long cycle lengths after a commercial startup.

Generally, non-acidic zeolite catalysts have high loadings of alkali or alkaline earth metals, e.g., about 15 wt % $K_2O$. Potassium is often the predominant metal for non-acidic L-zeolites, as in the examples described herein. Yet, even with so much alkali present, it appears to be desirable to reduce the alkali content of bound hiz-cats somewhat. While not wishing to be bound by theory, it is believed that the readily-removable (i.e., soluble) alkali, both sodium and potassium, captures evolved chloride from the hiz-cats during startup and thus prevents the desired Pt dispersion. Removal of this alkali by water washing allows for improved Pt dispersion and catalyst performance. What appears to be important for bound hiz-cats is to have sufficient evolved chloride to (re)disperse the Pt in-situ. Thus, we believe that adding refractory halide salts, e.g., alkali halides such as KCl, will not provide the desired evolved halide. Refractory halide salts, when added, are not included in calculating the halide content of hiz-cats.

We expect that the need to improve catalyst performance by washing before halide addition will apply to other halided, medium pore and large pore zeolite catalysts, as well as to the use of these bound hiz-cats in processes other than catalytic reforming. For example, this washing should be advantageous for the halided zeolite catalysts described in U.S. Pat. No. 5,260,238 to Murakawa et al.

Zeolites

Catalysts useful in this invention comprise one or more zeolites or non-zeolitic molecular sieves and at least one catalytic metal, preferably a Group VIII metal. The catalyst usually also includes a binder such as a refractory oxide, e.g., silica, alumina, chlorided alumina or silica-alumina. Preferred zeolites and/or molecular sieves are selected from those of the large and intermediate pore variety.

Representative of the large pore zeolites are ZSM-3, ZSM-4, ZSM-10, ZSM-12, ZSM-20, zeolite beta, zeolite omega, zeolite L, zeolite X, zeolite Y, REY, USY, RE-USY, mordenite, LZ-210, LZ-210-M, LZ-210-T, LZ-210-A, SSZ-24, SSZ-26, SSZ-31, SSZ-33, SSZ-35, SSZ-37, SSZ-41, SSZ-42, SSZ-44 and MCM-58. ZSM-3 is described in U.S. Pat. No. 3,415,736; ZSM-4 is described in UK 1,117,568; ZSM-10 is described in U.S. Pat. No. 3,692,470; ZSM-12 is described in U.S. Pat. No. 3,832,449; ZSM-20 is described in U.S. Pat. No. 3,972,983; Zeolite beta is described in U.S. Pat No. Re. 28,341(of original U.S. Pat. No. 3,308,069); Zeolite omega is described in U.S. Pat. No. 4,241,036; Zeolite L is described in U.S. Pat. No. 3,216,789; Zeolite X is described in U.S. Pat. No. 2,882,244; Zeolite Y is described in U.S. Pat. No. 3,130,007; LZ-210, LZ-21 OM, LZ-210-T, LZ-210-A and mixtures thereof are described in U.S. Pat. No. 4,534,853; SSZ-24 is described in U.S. Pat. No. 4,834,977; SSZ-26 is described in U.S. Pat. No. 4,910,006; SSZ-31 is described in U.S. Pat. No. 5,106,801; SSZ-33 is described in U.S. Pat. No. 4,963,337; SSZ-35 is described in U.S. Pat. No. 5,316,753; SSZ-37 is described in U.S. Pat. No. 5,254,514; SSZ-41 is described in U.S. Pat. No. 5,591,421; SSZ-42 is described in US Ser. No. 08/199,040; SSZ-44 is described in U.S. Pat. No. 5,580,540; MCM-58 is described in U.S. Pat. No. 5,437,855. The entire contents of all these patents and patent applications are incorporated herein by reference.

In a preferred embodiment, the invention uses an L-zeolite or a zeolite having an L-zeolite-type channel structure and size, such as ECR-2, which is described in U.S. Pat. No. 4,552,731, and ECR-31, which is described in U.S. Pat. No. 5,624,657 (Vaughan). Preferably the invention uses a monofunctional, non-acidic K L-zeolite. Acidity in the L-zeolite generally leads to poor performance in catalytic reforming. Examples of useful L-zeolites include those described in U.S. Pat. No. 3,216,789 (Breck), 4,552,731 (Vaughan), 4,544,539 (Wortel), 5,491,119 (Verduijn) and 4,530,824 (assigned to Tosoh Ltd.). The entire contents of all these patents are incorporated herein by reference. One useful non-acidic L-zeolite is manufactured by Union Oil Product (UOP), Mobile, Ala. A preferred non-acidic L-zeolite is manufactured by 1Tosoh Ltd., Japan, and sold under the name HSZ-500KOA. For these non-acidic zeolites, potassium is a preferred cation; a preferred catalyst comprises K L-zeolite.

Preferred catalysts used in the process of the present invention are monofunctional. They do not have the acid function of conventional reforming catalysts. In contrast, conventional reforming catalysts are bifunctional, with an acid and a metal function. Examples of monofunctional catalysts include platinum on L-zeolite, wherein the L-zeolite has been exchanged with an alkali metal, as disclosed in U.S. Pat. No. 4,104,320 to Bernard et al.; platinum on L-zeolite, wherein the L-zeolite has been exchanged with an alkaline earth metal, as disclosed in U.S. Pat. No. 4,634,518 to Buss and Hughes; and platinum on L-zeolite as disclosed in U.S. Pat. No. 4,456,527 to Buss, Field and Robinson. The entire contents of all these patents are incorporated herein by reference The term "non-acidic" is understood by those skilled in this area of art, particularly by the contrast between monofunctional (non-acidic) reforming catalysts and bifunctional (acidic) reforming catalysts. One method of achieving non-acidity is by replacing protons with alkali and/or alkaline earth metals in the zeolite. This is preferably achieved, along with other catalyst enhancements, by an ion exchange process on the synthesized zeolite.

The composition of type L zeolite expressed in terms of mole ratios of oxides, may be represented by the following formula:

$$(0.9-1.3)M_{2/n}O:Al_2O_3(5.2-6.9)SiO_2:yH_2O$$

In the above formula M represents a cation, n represents the valence of M, and y may be any value from 0 to about 9. Zeolite L, its X-ray diffraction pattern, its properties, and method for its preparation are described in detail in, for example, U.S. Pat. No. 3,216,789, the contents of which is hereby incorporated by reference. The actual formula may vary without changing the crystalline structure. For example, the mole ratio of silicon to aluminum (Si/Al) may vary from 1.0 to 3.5.

As discussed above, one preferred embodiment of the invention uses monofunctional Pt L-zeolite catalysts that have been treated with halogen-containing compounds. This type of halogen treatment is known. For example, U.S. Pat. No. 5,091,351 to Murakawa et al., discloses preparing a Pt L-zeolite catalyst, and then treating it with a halogen-containing compound. Other related patents that disclose halided L-zeolite catalysts include EP 498,182A or U.S. Pat. No. 5,354,933, which discloses co-impregnation of an L-zeolite with $NH_4Cl$ and $NH_4F$; U.S. Pat. No. 4,681,865, 4,761,512 and 5,073,652 to Katsuno et al. These patents are all incorporated herein by reference. One preferred hiz-cat for catalytic reforming comprises halided platinum K L-zeolite catalyst, especially one containing both chloride and fluoride.

Useful intermediate pore size zeolites are exemplified by ZSM-5, ZSM-11, ZSM-22, ZSM-23, ZSM-35; ZSM-48, ZSM-57, SUZ-4, SSZ-23; SSZ-25; SSZ-28, SSZ-32, and SSZ-36. ZSM-5 is described in US Re. 29,948 (of original U.S. Pat. No. 3,702,886); ZSM-1 I is described in U.S. Pat. No. 3,709,979; ZSM-22 is described in U.S. Pat. No. 4,556,477; ZSM-23 is described in U.S. Pat. No. 4,076,842. ZSM-35 is described in U.S. Pat. No. 4,016,245; ZSM-48 is described in U.S. Pat. No. 4,585,747; SUZ-4 is described in EP 353,915; SSZ-23 is described in U.S. Pat. No. 4,859,422; SSZ-25 is described in U.S. Pat. Nos. 4,827,667 and 5,202,014; SSZ-28 is described in U.S. Pat. No. 5,200,377; SSZ-32 is described in U.S. Pat. No. 5,053,373; and SSZ-36 is described in US Serial No. 60/034,252. The entire contents of all these patents and patent applications are incorporated herein by reference.

In addition to silicon, the useful zeolites herein can contain one or more framework elements other than, or in addition to, aluminum, e.g., the borosilicate zeolites. Also, the zeolites can be modified to alter their as-synthesized framework silica to alumina ratio.

Catalysts useful in the present invention can also include non-zeolitic molecular sieves with intermediate or large size pores. Non-zeolitic molecular sieves are microporous compositions that are formed from $[AlO_2]$ and $[PO_2]$ tetrahedra and have electrovalently neutral frameworks. See U.S. Pat. No. 4,861,743. Also included among the useful zeolites are materials of similar structure or behavior, e.g., crystalline metallophosphates such as those described in U.S. Pat. No. 4,440,871. Non-zeolitic molecular sieves include aluminophosphates ($AlPO_4$) as described for example in U.S. Pat. No. 4,310,440, metalloaluminophosphates, as described in U.S. Pat. Nos. 4,500,651; 4,567,029; 4,544,143; and 4,686,093 and nonmetal substituted aluminophosphates as described in U.S. Pat. No. 4,973,785.

Useful catalysts also include intermediate pore silicoaluminophosphates (SAPO's) as the non-zeolitic molecular sieve component. Intermediate pore SAPO's include SAPO-11, SAPO-31, SAPO-41 and SM-3. U.S. Pat. No. 4,440,871 describes SAPO's generally and SAPO-11, SAPO-31, and SAPO-41 specifically. The preparation of SM-3 and its unique characteristics are described in U.S. Pat. No. 5,158,665. All these patents are incorporated herein by reference.

Binders

In preparing catalysts for use in the present invention, the zeolites and/or molecular sieves are bound. They are preferably composited with matrix materials resistant to the temperatures and other conditions employed in hydrocarbon conversion processes. Such matrix materials can include active and inactive materials. Frequently binders, such as naturally occurring clays and inorganic oxides, are added to improve the crush strength of the catalyst. The selection of binders and binding conditions depends on the zeolite and its intended use.

The binder material can be selected from among synthetic or naturally occurring zeolites, as well as alumina, clays such as montmorillonite and kaolin, and the refractory oxides of metals of Groups IVA and IVB of the Periodic Table of the Elements. Particularly useful are the oxides of silicon, titanium and zirconium, with silica being preferred, especially low acidity silica. Combinations of such oxides with other oxides are also useful, for example, silica-alumina, silica-magnesia, silica-zirconia, silica-thoria, silica-beryllia, silica-titania, titania-zirconia, silica-alumina-thoria, silica-alumina-zirconia, silica-alumina-magnesia and silica-magnesia-zirconia. These oxides can be crystalline or amorphous, or can be in the form of gelatinous precipitates, colloids, sols, or gels. Silica in the form of a silica sol is a preferred binder. A preferred silica sol has about 30 wt % silica and contains small particles (7–9 nm in diameter), which result in catalysts with good attrition resistance and excellent crush strengths.

Forming pellets or extrudates from zeolites and/or molecular sieves generally involves using extrusion aids and viscosity modifiers in addition to the binders. These additives are typically organic compounds such as cellulose based materials, for example, Methocel® sold by Dow Chemical Co., ethylene glycol, and stearic acid. Many such compounds are known in the art. It is important these additives do not leave a detrimental residue, i.e., one with undesirable reactivity or one that can block pores, after calcination. For this invention, it is especially desirable that such residues do not add significant amounts of alkali or alkaline earth ash to the catalyst. The above-described washing will remove low levels of these materials. The residue from the extrusion aid is preferably less than a few tenths of a percent, more preferably less than 0.1 wt %.

Methods for preparing catalyst compositions are well known to those skilled in the art and include such conventional techniques as spray drying, pelletizing, extrusion, various sphere-making techniques and the like. The newly developed method of in-extrudate formation of the zeolite/binder as described in Miller, U.S. Pat. No. 5,558,851 and U.S. Pat. No. 5,514,362 can also be used. The entire contents of these patents are incorporated herein by reference.

The relative proportions of zeolite to the binder/matrix can vary widely.

Generally the zeolite content ranges from between about 1 to about 99 weight percent, and more usually in the range of from about 5 to about 95 weight percent, of the dry composite, more typically 50–85%.

The invention requires a bound zeolite. It is preferred to use whole extrudates rather than crushed extrudates or unbound zeolites in commercial operations. Bound zeolites reduce the pressure drop through a reactor, provide improved flow rates, and are easier to load and unload. However, the diffussion characteristics of whole extrudates are quite different from those of unbound powdered zeolites. The interaction of a diffusing gas, such as a halocarbon, is different for a powdered versus a bound zeolite. Diffusion differences would also be especially significant if the catalyst evolves materials such as gases or solids, for example during startup. Moreover, the act of binding itself—including selecting binding materials and the binding method—as well as calcining can affect catalyst performance. For example, the binder can interact with the sieve by simply blocking internal and external sites or by chemical interaction (e.g., alkali from a basic sieve like the preferred L-zeolite of the present invention and silica are known to react under thermal and hydrothermal calcination conditions). Moreover, the distribution of impregnated materials may vary considerably on zeolite powder versus bound zeolites. Thus, studies on powders alone cannot be used to predict commercial performance of bound zeolite catalysts.

Group VIII Metal

It is preferred that the catalyst herein comprises at least one Group VIII metal, preferably a noble metal (Pt, Pd, Rh, Ir, Ru, Os) and more preferably platinum.

Preferred amounts of metal are 0.1 to 5 wt %, more preferably 0.1 to 3 wt %, and most preferably 0.3 to 1.5 wt %, based on the L-zeolite. Platinum compounds that form positively charged platinum complex ions in solution are the preferred source of platinum. Platinum tetraammine chloride and nitrate are especially preferred.

To these Group VIII metals can also be added one or more non-platinum group metals such as tin, indium and metals of Group VIIB such as rhenium. Examples include Pt/Sn, Pt/Pd, Pt/Ni, and Pt/Re. These metals can be readily introduced into the composite employing a variety of known and conventional techniques, e.g., ion-exchange, incipient wetness, pore fill, impregnation, etc. Care should be taken so that the Group VIII metal, e.g., platinum, is incorporated in a manner that results in excellent and uniform dispersion. The incipient wetness impregnation method is preferred.

Washing and Adding Halides

According to one embodiment, the catalyst used in this invention is prepared by a process that includes extruding and then washing either the bound catalyst or the catalyst base before halide addition. Preferably, the catalyst is prepared by a process that includes the steps of: (a) preparing a calcined silica-bound zeolite catalyst base; (b) washing said bound zeolite catalyst base with a liquid comprising water, and (c) incorporating a group VIII metal and halogen-containing compound(s) comprising chlorine and fluorine into said washed base to produce a halided zeolite catalyst. Preferably, the catalyst is prepared using a low alkali, e.g., low sodium, extrusion aid in step (a). The Pt and halogen-containing compounds can be incorporated sequentially or, preferably, simultaneously.

The term washing, as used herein, is meant to include any process where water in excess of the material's pore volume is contacted with the catalyst base. Preferably, the washing is done with clean water that is roughly neutral (pH 5 to 9,) low in sulfur (e.g., sulfate-free,) and low in alkali and alkaline earth content (<0.05 wt %). More preferably, the wash water is distilled or deionized water.

It is preferred that the calcined catalyst base or calcined catalyst is washed before halide addition and that at least 20%, preferably at least 50%, of the readily removable alkali is removed. The "readily removable" alkali is the alkali that can be washed out of the catalyst base after 5 washings (1:1 volume of liquid to wt of extrudate) at ambient temperature. However, the temperature, amount of water and contact time in the washing steps are not critical, as long as the washing improves cycle length following startup at SCSU conditions. The wash water may contain additives, such as alcohol, although this is not preferred.

There are many ways to wash the catalyst, or preferably the catalyst base, that will be apparent to those skilled in the art. These include, for example, cover and drain, dipping, and belt washing. The type of washer is not believed to be critical. The washed base is then dried. Although not required, it is preferred to dry and calcine the washed base produced in step (b) prior to incorporating the halogen-containing compound(s).

As noted earlier, we have found that washing the bound catalyst or the catalyst base before halide addition is important. As will be appreciated by those skilled in the art, there are various ways to perform the washing step; this is especially true as one moves from laboratory to full commercial scale manufacturing. For example, the washing can be static or stirred. The solution, or the solution and the extrudate may be stirred. The wash water may be recirculated, with or without fresh water makeup, in a recycle mode. A bleed stream of effluent wash water may be removed and make-up or added fresh wash water may be used. The wash process may be operated in a variety of batch, semi-continuous or continuous modes. Generally, the details of the wash step will vary somewhat, depending on the equipment used for washing. It is not necessary or possible to specify all possible wash conditions here, but these will be evident to the skilled artisan.

Three key wash variables are contact time, number of washes and wash temperature. A longer contact time (between the calcined catalyst base and the water) allows for more efficient removal of the silica and alkali. The contact time is preferably long enough to dissolve the maximum amount of material (detritus), but not so long as to be uneconomical due to slow throughput. Conversely, too short a contact time could mean that all the detritus was not dissolved or removed. Residual detritus can cause pore blockage and/or loss of surface area, with resultant poorer catalyst performance.

More than one washing step is advantageous. Preferably the number of washes is between 2 and 20, more preferably between 3 and 8, and most preferably between 3 and 5.

We have found that the temperature of the wash water is important for facilitating efficient and sufficient washing. Washing at a temperature above ambient, for example around 140° F. and 180° F., has been found to give superior recovery of porosity and higher surface areas for the resulting washed catalyst base. Wash temperatures are preferably between ambient and 210° F., more preferably between 50 and 200° F., and most preferably between 100 and 190° F. In one preferred embodiment, the calcined catalyst base is washed at least twice with wash water having a temperature above about 100° F. More preferably, the calcined catalyst base is washed at least three times with wash water having a temperature above about 140° F. A well-washed catalyst base will demonstrate good catalytic performance after the catalytic metals are loaded.

We have found that after room temperature washings, the surface area and microporosity of the resulting washed calcined base is not always equal to (or greater than) that of the starting calcined base before washing. While not wishing to be bound by a theory, we believe that this lower surface area and porosity are due to incomplete removal of the alkali and silica during the washing steps. We have solved this problem by using higher wash temperatures and/or increased number of washing steps. We have found that with five washes with water in the 140° F. to 180° F. range, the resulting washed calcined base generally has equal or superior surface areas and microporosities as compared to the starting calcined base. Preferred wash conditions thus include elevated temperatures and multiple washings.

Washing has also been found to increase the surface area and porosity of the extruded base, as measured by the micropore volume. Preferably, the washing is done until the surface area of the washed catalyst base after calcination returns to at least 80%, more preferably to at least 90%, and most preferably to at least 100% or more, of the surface area of the calcined catalyst base before washing.

Although hiz-cats can contain only one halide, it is preferred that they contain more than one halide, e.g., chloride and fluoride. Halogens, when there are more than one, can be added separately or, preferably, at the same time. The halogen(s) can be added during platinum addition or in a separate pre- or post-addition step. In a preferred embodiment, they are added during Pt impregnation. The preferred amount of halide, e.g., chloride and/or fluoride, in the calcined catalyst depends on the type of zeolite, the catalytic metal and its loading, and the type of hydrocarbon conversion. For L-zeolite catalysts used for catalytic reforming, which contain about 1.0 wt % Pt, the chloride level after calcination is preferably between 0.4 and 1.0 wt %, more preferably between 0.5 and 0.8 wt %. Preferably, fluoride is also present, preferably at levels between 0.5 and 0.9 wt %, after calcination, more preferably between 0.6 and 0.8 wt %. The resulting bound hiz-cats are especially useful for preparing aromatic hydrocarbons such as benzene, toluene and xylenes from $C_6$–$C_8$ aliphatic hydrocarbons.

Bound hiz-cats can be prepared using a variety of halide sources; preferred hiz-cats are prepared using amine or ammonium salts. The halides are preferably added by contacting the washed catalyst base with one or more of these halide salts. For L-zeolite reforming, preferred salts are ammonium chloride and ammonium fluoride. These halide salts and the catalytic metal(s) can be added sequentially in any order, or the salts can be added along with the metal, which is preferred. When determining the halide on the catalyst, it comprises both the halide added from the (amine) halide salt and any halide associated with the catalytic metal. When halide is added after Pt addition, it is preferred to add the halide before metal reduction.

For example, one preferred halided Pt L-zeolite catalyst is prepared by impregnating a washed and calcined bound zeolite as described above with an impregnating solution of ammonium chloride, ammonium fluoride and platinum tetraammine chloride. Preferably, in amounts added yield an intermediate having 0.9 wt % each for fluoride and chloride and 1.0 wt % Pt. This intermediate is vacuum dried at about 40–100° C. and then calcined, preferably at a temperature from 260° C. to 350° C., e.g., at about 300EC. When amine halides are used, the calcining should be done so as to decompose these salts slowly. Care should be taken not to dry or calcine under conditions that would disturb the even distribution of the ingredients. A uniform distribution, i.e., a flat profile across the bound catalyst, is preferred for both Pt and the halides.

If desired, an ion-exchange step, for example with potassium ions, e.g., KCl or $KNO_3$, can be done before the wash step to reduce acidity in the catalyst. As will be recognized by those skilled in the art, those ion exchange reactions that would be useful in the present invention should be carried out within controlled pH parameters, e.g., between about 4 to 10.8. This will avoid damage to the catalyst or binder and, for catalysts that are intended to be non-acidic, will avoid adding any significant acidity.

Commercial Start-up and Cycle Length

As noted earlier, commercial startup conditions differ substantially from laboratory startup conditions. These differences are primarily due to 1) the need to control temperatures, and heat transfer considerations, and 2) the ability to achieve practical flow rates associated with use of commercial recycle compressors in conventional catalytic reformers. Thus, as used herein, commercial startup conditions for reforming encompass: low gas flow rates. For example a GHSV of between 400 and 2000 $hr^{-1}$, more preferably between 600 and 1500, and most preferably around about 1000 $hr^{-1}$. A commercial start-up also means having "slow" heat-up rates, for example, between 5 and 50° F./hr, more preferably between 10 and 25° F./hr during catalyst reduction above about 500° F. This slow heat-up minimizes catalyst damage. Commercial startups may also include holding the temperature at various levels for several hours or days. This can, for example, facilitate complete reduction of the catalyst metal. Test startup conditions for SCSU and LSU are shown in Table 1. Commercial startups for hiz-cats used for reforming generally include the following steps: 1) dryout of the catalyst, 2) reduction of the catalyst, and 3) introduction of the feed into the reformers. These steps are usually done in-situ after loading the catalyst into the reformer(s), but some or all of these steps can be done outside the reactor, i.e., ex-situ.

Preferred catalysts useful in this invention have good activity and maintain low fouling rates over many weeks after startup at SCSU conditions. Preferred catalysts have a cycle length >1200 hr, preferably >2000 hr and more preferably >4000 hr. The term "cycle length", as used herein, is the time (oftentimes extrapolated) from start of run (beginning with feed addition) until the temperature reaches 920° F. Temperature is adjusted throughout the run so that the catalyst produces a specific target wt % aromatics in the C5+ product. This target depends on the composition of the raffinate feed and is typically between 45 and 50 wt % aromatics. Transient temperature excursions are sometimes seen during the first 100–300 hr of a run. When present, these temperature excursions (but not the time) are ignored in determining the cycle length. Cycle length depends on many factors, including for example, the $H_2$ to hydrocarbon ratio, the composition and type of feed, the space velocity (LHSV,) which is related to the feed to catalyst ratio, and the severity (e.g., operating temperature or alternatively, degree of conversion). To better enable one skilled in the art to understand the invention and determine its scope, we have developed a simple test to measure the cycle length of a catalyst (see Example 9). The bound and washed hiz-cats useful in this invention have a longer cycle length after a commercial startup at SCSU conditions than catalysts prepared in a manner similar to EP 498,182A or U.S. Pat. No. 5,354,933, Ex. 4, as described in Example 1 hereinbelow.

Conversion Processes

According to one embodiment, the invention is a catalytic reforming process, e.g., low sulfur reforming using a bound, halided Pt L-zeolite catalyst. Catalytic reforming is well known. For example, it is described in the book, *Catalytic Reforming,* by D. M. Little, PennWell Books (1985), which is incorporated herein by reference in its entirety. Preferred reforming process conditions include a temperature between 700 and 1100° F., more preferably between 800 and 1050° F.; a pressure between 0 and 400 psig, more preferably between 15 and 150 psig; a recycle hydrogen rate sufficient to yield a hydrogen to hydrocarbon mole ratio for the feed to the reforming reaction zone between 0.1 and 20, more preferably between 0.5 and 10 and most preferably between 2 and 6; and a liquid hourly space velocity (LHSV) for the hydrocarbon feed over the reforming catalyst of between 0.1 and 10 $hr^{-1}$, more preferably between 0.5 and 5 $hr^{-1}$. Reforming produces hydrogen. Thus, additional hydrogen is not needed except when the catalyst is reduced upon startup, and when the feed is first introduced. Once reforming is underway, part of the hydrogen that is produced is preferably recycled over the catalyst.

The feed to the reforming process of the present invention typically is or is derived from naphtha that contains at least some acyclic hydrocarbons or alkylcyclopentanes. Particularly preferred feeds include raffinates from an aromatics extraction unit, such as a Udex raffinate; $C_6$–$C_9$, $C_7$–$C_9$, $C_8$–$C_9$, $C_6$–$C_8$, $C_7$–$C_8$, $C_7$ and $C_8$ fractions, especially fractions containing mixtures of five and six-member saturated rings. Preferably, these fractions are obtained by distilling wider boiling range naphtha, or by distilling a raffinate from an aromatics extraction unit. The feed should be substantially free of sulfur, nitrogen, metals and other known poisons. These poisons can be removed by first using conventional hydrofining techniques, then using sorbents to remove the remaining sulfur compounds and water. In a preferred embodiment, the hydrocarbons contacting the catalyst are substantially dry and free of sulfur, i.e. sulfur levels are preferably maintained below about 50 ppb, preferably below about 25 ppb and more preferably below about 10 ppb. Sulfur removal systems are well known in the ultra low sulfur reforming art. They include mild reforming using hydrogen and Pt on alumina, followed by sorption. Sorbents are well known in the art; examples include K on alumina, nickel oxide, and manganese oxide.

The feed can be contacted with the catalyst in a fixed bed system, a moving bed system, a fluidized system, or a batch system. Either a fixed bed system or a moving bed system is preferred. In a fixed bed system, the preheated feed is passed into at least one reactor that contains a fixed bed of the catalyst. The flow of the feed can be upward, downward or radial. The effluent from the catalytic reforming reaction zone can be separated into the desired streams or fractions. Benzene, toluene and $C_8$ aromatic streams can be recovered using conventional techniques such as distillation and extraction.

Although discussed above in terms of catalytic reforming, the invention is applicable to a variety of catalytic conversion processes that use bound, halided zeolite catalysts to convert feed to products. Preferred hydrocarbon conversion processes include dehydrocyclization, especially dehydrocyclization of $C_6$ to $C_8$ paraffins to aromatics; catalytic reforming; non-oxidative and oxidative dehydrogenation of hydrocarbons to olefins and dienes; dehydrogenation of ethylbenzene to styrene and/or dehydrogenation of isobutane to isobutylene; conversion of light hydrocarbons to aromatics; transalkylation of toluene to benzene and xylenes; hydrodealkylation of alkylaromatics to aromatics; alkylation of aromatics to alkylaromatics; production of fuels and chemicals from syngas ($H_2$ and CO); steam reforming of hydrocarbons to $H_2$ and CO; production of phenylamine from aniline; methanol alkylation of toluene to xylenes; and dehydrogenation of isopropyl alcohol to acetone. More preferred hydrocarbon conversion processes include dehydrocyclization, catalytic reforming, dehydrogenation, isomerization, hydrodealkylation, and conversion of light hydrocarbon to aromatics, e.g., Cyclar-type processing. These processes, their commercial startup conditions and their useful range of process operating conditions are all well known to those skilled in the art. These processes can be carried out in a single reactor or in a series of reactors, at least one of which contains the bound and washed hiz-cat described hereinabove.

In a preferred embodiment, the invention is a hydrocarbon conversion process comprising the catalytic conversion of a hydrocarbon-containing feed to product under conversion conditions that include a commercial-type catalyst startup (at a low gas flow rate and a slow heat-up rate), said process using a bound and washed halided zeolite catalyst containing a Group VIII metal, wherein said halided catalyst has a cycle length of >1200 hr following said startup. In another embodiment, the invention is a hydrocarbon conversion process, comprising the catalytic conversion of a hydrocarbon-containing feed to product under conversion conditions that include a catalyst startup at a low gas flow rate and a slow heat-up rate, said process using a halided zeolite catalyst containing a Group VIII metal, said halided catalyst prepared by a process comprising washing a bound zeolite catalyst base or catalyst before halide addition and before reduction.

According to another embodiment, the invention is the washed halided zeolite catalyst. A preferred catalyst has a cycle length >1200 hr following startup at SCSU conditions. As discussed earlier, one preferred catalyst is prepared by a process that includes the steps of preparing a calcined silica-bound zeolite catalyst base; washing said bound zeolite catalyst base with a liquid comprising water; and either simultaneously or sequentially incorporating a group VIII metal and one or more halogen-containing compound(s) comprising chlorine and fluorine into said washed base to produce a halided zeolite catalyst. Preferably, the catalyst is prepared using a silica sol that is low in alkali, and a low-alkali extrusion aid. The extruded base is calcined and then washed before halide addition. The washed base can again be calcined (for example, at 950–150E F, preferably between 1000–1000E F) prior to incorporating the halogen-containing compound(s). Preferably, the halides are added along with the Pt.

EXAMPLES

To obtain a more complete understanding of the present invention, the following examples illustrating certain aspects of the invention are set forth. It should be understood, however, that the invention is not intended to be limited in any way to the specific details of the examples.

Example 1

Preparing a Halided Platinum L-zeolite Catalyst (Comparative)

A halided platinum L-zeolite catalyst was prepared in a manner similar to Example 4 of EP 498,182A or U.S. Pat. No. 5,354,933,. To 100 parts by weight of K L-type zeolite (Tosoh, Ltd., Japan), 20 parts by weight of a silica binder (SI-350 silica sol, sold by Cat. & Chem. Ind. Inc. [CCIC], Japan) were added with mixing. This mixture was kneaded and molded, and then air-calcined at 500° C. (932° F.) for 2 hr to produce a molded calcined silica-bound L-zeolite extrudate. An impregnation liquid comprising 0.166 g of ammonium fluoride, 0.075 g of ammonium chloride, 0.171 g of platinum tetraammine chloride and 4.8 g of ion exchange water was prepared. This liquid was slowly dropped into 10 g of the molded L-zeolite with stirring. The resulting solid was vacuum dried and then treated at 300° C. (572° F.) for 3 hr in dry air. The resulting hiz-cat contained about 0.7 wt % F and 0.7 wt % Cl. The sodium was 0.56 wt %, as measured by atomic adsorption.

Example 2A

Large Scale Preparation of Washed Base

A calcined L-zeolite extrudate was prepared on a large scale in a manner similar to Example 1 using a Tosoh L-zeolite, SI-350 silica sol, and methyl cellulose (Methocel®) as an extrusion aid. The extrudate (1800 lb) was placed in a large tank and covered with wash water (1.5 g/g base) that was low in alkali (4 ppm $Na_2O$ and I ppm $K_2O$), alkaline earths, and sulfur species. The water, which had a pH of 7.3, was added over about 30 min and then drained from the tank over about 30 min. The extrudate was washed twice more in the same way. The resultant material was then dried and calcined at 950° F. in a rotary calciner. The Na content of the final wash water was less than 100 ppm and the K content was less than 150 ppm. The washing reduced the Na content of the catalyst base from 0.48 to 0.38 wt %.

This triple wash procedure was repeated on another catalyst base sample. The filtrate water contained the following alkali and silicon levels (ppm).

|  | $Na_2O$ | $K_2O$ | $SiO_2$ |
| --- | --- | --- | --- |
| 1st wash water | 374 | 561 | 526 |
| 2nd wash water | 127 | 194 | 476 |
| 3rd wash water | 64 | 98 | 278 |

Example 2B

Preparing a Finished Catalyst

To make a finished catalyst, 160 g (on a volatile-free basis) of the washed and calcined extrudate of Ex. 2A was impregnated by pore fill at about 100% of the pore volume. The pore fill solution comprised 2.86 g of tetraammine platinum chloride (56% Pt), 2.8 g of ammonium fluoride, and 1.3 g of ammonium chloride dissolved in water. After completion of the pore fill, the impregnated base was allowed to stand for 2 hr. It was then put on a rotary evaporator under 22 inches of vacuum for three hr at 212° F. The resultant dry impregnated extrudate was heated from 75° to 575° F. over a one-hr period and then calcined at 570° F. for I hr with 10 SCFH of dry air flowing through the bed. Analysis of the catalyst showed it contained 1 wt % Pt, 0.74 wt % Cl and 0.79 wt % F.

Example 3A

Single Washed Catalyst

A calcined extrudate was prepared comprising 83% Tosoh L-zeolite (0.28 wt % Na) bound with 17% SI-350 silica. It had a Na content of about 0.5 wt %. It was washed with deionized water (2.5 cc $H_2O$/g of base) at room temperature with stirring for 15 minutes. This wash time was sufficient to achieve good contacting of the solids and liquids. The wash water contained 230 ppm Na and 450 ppm K as analyzed by ICP. The washed extrudate was then dried and calcined in air at 1000° F. This wash and calcine procedure reduced the sodium content of the base to between 0.37–0.41 wt %.

Example 3B

Impregnation Procedure and Resulting Catalyst Properties

The procedure of Ex. 2B was followed using the base of Ex. 3A. The resulting catalyst made from the washed base of Ex. 3A contained 0.81 wt % Cl and 0.72 wt %° F. and nominally (i.e., as added) 1 wt % Pt.

Example 4A

Triple Washed Base

The procedure of Ex. 3A was repeated except that the wash step was repeated 3 times. The sodium content of the catalyst base was 0.38 wt % after the third washing.

The filtrate water contained the following alkali levels (ppm in solution) as analyzed by ICP.

|  | Na | K |
|---|---|---|
| 1st wash water | 245 | 455 |
| 2nd wash water | 62 | 108 |
| 3rd wash water | 26 | 41 |

A repeat of this triple wash procedure resulted in filtrate water containing the following materials (ppm).

|  | Na | K | Si | $SO_4$ |
|---|---|---|---|---|
| 1st wash water | 238 | 497 | 247 | 14 |
| 2nd wash water | 73 | 143 | 125 | 3 |
| 3rd wash water | 44 | 90 | 132 | <1 |

One must take care to avoid over-washing the catalyst. Over-washing can lead to excess acidity, which will result in decreased selectivity. Generally, washing with about 1–3 volumes of water per weight of catalyst is adequate. We have used 2.5.

Example 4B

Impregnation and Catalyst Properties

The procedure of Ex. 2B was followed using the base of Ex. 4A. The resulting catalyst made from the washed base of Ex. 4A was nominally loaded to 1.0 wt % Pt and contained 0.69 wt % Cl and 0.65 wt % F.

Example 5

Pilot Plant Configuration

Catalyst performance was assessed in pilot plants employing a 1-inch ID type 316 stainless steel in a vertical tubular reactor. Between 40 and 130 cc of whole extrudate catalyst (about 0.07 inch, screened to L/I) of 2 to 3) was loaded into the reactor. Six thermocouples were equally spaced vertically in the catalyst bed. The term "catalyst temperature" as used herein is the catalyst average temperature (CAT). It is calculated from the six thermocouple temperatures as follows:

$$CAT = \tfrac{1}{10}(TC_1 + TC_6) + \tfrac{1}{5}(TC_2 + TC_3 + TC_4 + TC_5)$$

where TC is the temperature of thermocouple $C_x$, and the thermocouples are arranged and numbered in order starting at the top of the catalyst bed.

Example 6

Start-up Procedure for Lab Test Units

The LSU was done in the pilot plant of Ex. 5. The gases were not recycled and the evolved gases, including any halides, were vented. The procedure included drying and reducing the catalyst in $H_2$ from room temperature to 1000° F. at a ramp rate of 100° F./hr, and then maintaining the catalyst at about 1000° F. for 24 hr. GHSV was maintained at 10,000 $hr^{-1}$ during drying and reduction.

After completing the LSU, the catalyst was cooled to approximately 800° F. and then feed was introduced. The temperature was then adjusted to achieve the desired total wt % aromatics in the $C_{5+}$ product.

Although this LSU procedure is not commercially practical, it is much easier to perform and much quicker than a commercial type startup. Simulated commercial startups are more complex and can take a week or more to complete.

Example 7

Commercial Start-up

A commercial reformer startup procedure was simulated using the reactor of Ex. 5. The gases, including evolved gases, were recycled. The startup included drying the catalyst in $N_2$ from room temperature to 500° F. for 79 hr, then heating the catalyst in a mixture of 10% $H_2$ in $N_2$ from 500 to 932° F. at a rate of 10° F./hr over a period of about 43 hr, and then maintaining the catalyst at about 932° F. for 24 hr. The gas hourly space velocity (GHSV, which is volume of gas at STP per volume of catalyst) was maintained at 1300 $hr^{-1}$ for the drying and reduction periods. The total elapsed time between catalyst loading and feed introduction was 146 hr. Table 1 compares LSU and SCSU conditions.

TABLE 1

|  | Lab Start-up | Commercial Start-up |
|---|---|---|
| Gas Flow | Once through | Recycle |
| Pressure, psig | 0 | 57 |
| GHSV, $hr^{-1}$ | 10,000 | 1300 |
| Dry-out |  |  |
| Gas | $H_2$ | $N_2$ |
| Temp, ° F. | 500 | 500 |
| Reduction |  |  |
| Gas | $H_2$ | $H_2/N_2$ |
| Heat rate, ° F./hr | 100 | 10 |

TABLE 1-continued

|  | Lab Start-up | Commercial Start-up |
|---|---|---|
| Final temperature, ° F. | 1000 | 932 |
| Hold time, hr | 24 | 24 |
| Total startup time | 1.5–2 days | one week |

Example 8

Feed and Conditions Used for Tests

The feeds used for the performance tests were $C_6$–$C_7$ UDEX raffinates from a conventional catalytic reformer that were dried and hydrotreated to <50 ppb S. The sulfur content of these feeds was further reduced to <10 ppb by passing them, along with recycle hydrogen, over a Pt on chlorided alunina catalyst layered over a sorbent of K on alumina at 650° F. in a pre-treatment zone located in front of the bound hiz-cat. The feeds had the following compositions:

|  | (BBX 1593) Feed 1 | (BBX 1632) Feed 2 |
|---|---|---|
| API Gravity | 72.8 | 74.5 |
| D86 Distillation (° F.) |  |  |
| St/5% Pt. | 122/145 | 121/160 |
| 10%/30% | 150/157 | 163/167 |
| 50% | 166 | 177 |
| 70%/90% | 179/204 | 185/203 |
| 95%/EP | 217/256 | 121/228 |
| Feed Composition |  |  |
| C5 paraffins | 7.0 | 0.9 |
| olefins | 0.4 | 0.1 |
| naphthenes | 3.1 | 1.0 |
| aromatics | 0.0 | 0.0 |
| C6 paraffins | 40.3 | 40.6 |
| olefins | 1.6 | 1.3 |
| naphthenes | 8.0 | 3.6 |
| aromatics | 0.3 | 0.8 |
| C7 paraffins | 26.5 | 40.3 |
| olefins | 1.3 | 1.3 |
| naphthenes | 2.6 | 1.8 |
| aromatics | 2.2 | 1.3 |
| C8 paraffins | 4.4 | 6.5 |
| olefins | 0.1 | 0.1 |
| naphthenes | 0.5 | 0.4 |
| aromatics | 1.3 | 1.2 |

Feed 1 was a lighter Udex raffinate than Feed 2. It contained 10.5 wt % $C_5$ hydrocarbons and less $C_7$'s than $C_6$'s. Feed 2 contained less than 3 wt % $C_5$. Both feeds contained less than 1 wt % $C_9$.

The feeds were compared in side-by-side experiments at the following test conditions: a $H_2$/HC ratio of 3, a LHSV of 1.6; and a pressure of 100 psig. To achieve equivalent performance over a given catalyst, the wt % aromatics in the C5+ product was set at 46.5 wt % for Feed 1 and at 48.5 wt % for Feed 2. At these conditions using these feeds, good catalyst activity meant that the catalysts lined out at a CAT of between about 820 and 860° F., the lower the temperature, the better the activity.

Example 9

Determining the Cycle Length

After completing the SCSU, the catalyst was cooled to approximately 800° F. and then feed was introduced. The reactor temperature was adjusted to maintain an aromatics content of the liquid product as noted above. This was measured by gas chromatographic analysis.

The plot of CAT vs time was used to determine the cycle length. The term "cycle length" as used herein, is the number of hr to reach 920° F. from the start-of-run (SOR). It is calculated as 920° F-$T_{SOR}$/FR, where $T_{SOR}$ is the catalyst average temperature (CAT) extrapolated to time=0. FR is the fouling rate in hr; FR is the slope of CAT vs time, excluding any initial temperature excursions following startup. SOR, time=0, is when hot feed is provided to the catalyst.

Example 10

Performance of Catalysts

Using Lab Start-up (LSU) Conditions

The performance of catalysts from Ex. 1 and Ex. 2 were determined. Approximate 40 cc of catalyst was loaded into a pilot plant and reduced using the LSU conditions of Ex. 6. The test was continued for about 500 hr, during which both catalysts showed good activity and cycle lengths of >1200 hr.

Example 11

Performance of Catalysts

Using SCSU Conditions

The comparative catalyst of Ex. 1 was tested at the same reforming conditions as in Ex. 10, except that the SCSU conditions of Ex. 7 were used instead of the LSU conditions of Ex. 6. Feed 1 was used for this comparison. FIG. 1 shows that the catalyst displayed about the same initial activity after a SCSU (□) as with the LSU (o). However, the catalyst having the SCSU fouled surprisingly rapidly starting at about 200 hr onstream; see curve B. It had a cycle length of about 1100 hr. The figure shows that the catalyst prepared in the manner of EP 498,182A or U.S. Pat. No. 5,354,933 performs well after a laboratory startup, but fouls much more rapidly when a simulated commercial startup is used. This difference in catalyst performance as a function of startup conditions was unexpected. Moreover, modifications in the simulated startup conditions did not lead to significant improvements in catalyst performance.

Example 12

Impact of Washing the Catalyst Base

Catalysts prepared according to the wash procedures of Examples 2B, 3B and 4B were tested for reforming in pilot plants using SCSU conditions. They all showed good performance, e.g., long cycle lengths and low fouling rates after a simulated commercial startup.

Figure 2:
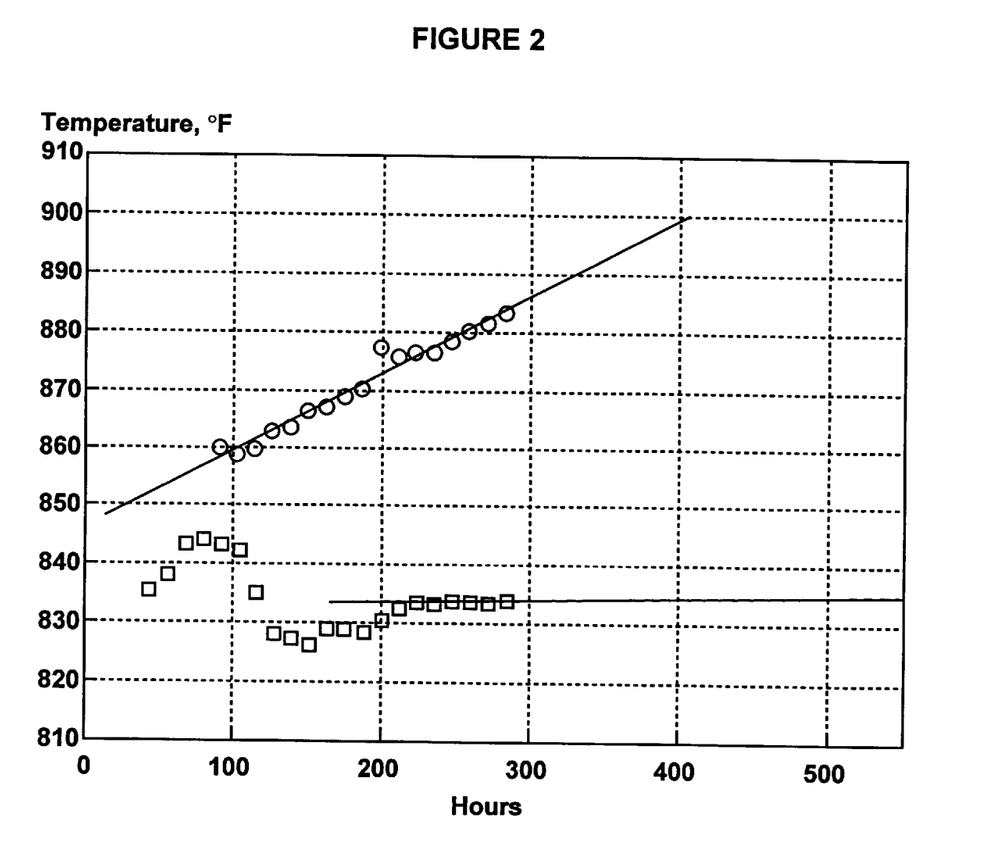
FIG. 2 compares the reforming performance after a startup at SCSU conditions of a bound Pt L-zeolite catalyst (circles) prepared in the manner of EP 498,182A or U.S. Pat. No. 5,354,933 with the performance of a bound and washed Pt L-zeolite hiz-cat of the invention (squares).

FIG. 2 shows a comparison of the reforming performance of two catalysts. Comparative catalyst 12A (o) was prepared in a manner similar to that in Ex. 1. This catalyst contained 0.56 wt % Na. Catalyst 12B (E), useful in the present invention, was prepared in a manner similar to Ex. 4B. This washed catalyst contained 0.34 wt % Na. The performance of these catalysts was compared using a SCSU and Feed 2. The benefit of washing the bound hiz-cat is evident. Catalyst 12B had a cycle length of >2000 hr, while comparative catalyst 12A had a cycle length of about 550 hr.

Example 13

Low Sodium Catalyst via Ion Exchange and Washing

A calcined extrudate was prepared comprising 83% Tosoh L-zeolite (0.28 wt % Na) bound with 17% SI-350 silica. It had a Na content of about 0.5 wt %. It was ion exchanged with 0.3 molar KNO3, 10 volume per weight at 180° F. for 3 hr, and washed 3 times with deionized water (2.5 cc $H_2O$/g of base) at room temperature with stirring for 15 minutes. The washed extrudate was then dried and calcined in air at 1000° F. for 2 hr. This ion exchange, wash and calcine procedure reduced the sodium content of the catalyst base to less than 0.09 wt %.

Pt impregnation and addition of ammonium halides results in a catalyst that performs well after a simulated commercial startup.

Example 14

Hot Water Washing of Extrudates

Table 2 below demonstrates the advantage of multiple washes at elevated temperatures. The experiments with calcined extrudate A, a silica bound L-zeolite catalyst base, were performed as described in Example 4A except that 140° F. water was used.

The experiments with calcined extrudate B, also a silica-bound L-zeolite catalyst base, used a cover and drain wash process. They were performed in a manner similar to that described in Example 2 except that the wash water temperature was 180° F.

The accessibility of the pore system, i.e., porosity, and surface area were measured by conventional techniques. The surface area was measured by the standard nitrogen B.E.T. method (using 5 points). The zeolite micropore volume was measured by the "t-plot" method. These methods are well known in the art and are merely illustrative; other pore blockage and porosity measurements can also be used. The washed extrudates were dried at about 250° F. and calcined at about 920° F. for about an hour before surface area and micropore volume were measured.

TABLE 2

Effect of High Temperature Washing on Porosity Properties

| Ex. No. | Description | Surface Area ($M^2$/g) | Micropore Volume (cc/g) |
|---|---|---|---|
| 14-A | Calcined extrudate A | 236 | 0.081 |
| 14-A2 | 2 washes at 140° F. | 215 | 0.072 |
| 14-A3 | 3 washes at 140° F. | 237 | 0.083 |
| 14-A5 | 5 washes at 140° F. | 242 | 0.084 |
| 14-B | Calcined extrudate B | 227 | 0.077 |
| 14-B5 | 5 washes at 180° F. | 256 | 0.092 |

Example 15

Catalyst Performance from Hot-Water Washed Extrudates

Catalysts were prepared from some of the materials described in Table 2, specifically from the 2 washes at 140° F. base (14-A2), the 5 washes at 140° F. base (14-A5) and the 5 washes at 180° F. base (14-B5). The catalyst preparation followed the method of Example 2B. The pilot plant testing of these three catalysts was performed as in Example 12 using SCSU conditions. The catalyst was run for about 500 hours. Catalyst performance is shown in Table 3.

TABLE 3

Catalyst Performance

| Ex. No. | Wash Procedure | Activity at 400–450 Hr | Fouling Rate |
|---|---|---|---|
| 15A | 2 washes at 140° F. | 833° | About 0.03° F./hr |
| 15B | 5 washes at 140° F. | 827° | Less than 0.01° F./hr |
| 15C | 5 washes at 180° F. | 824° | Less than 0.01° F./hr |

As can be seen, catalysts having an improved activity and fouling rates were obtained after additional washings (15B and 15C) at elevated temperatures.

While the invention has been described above in terms of preferred embodiments, it is to be understood that variations and modifications may be used as will be appreciated by those skilled in the art. Indeed, there are many variations and modifications to the above embodiments, which will be readily evident to those skilled in the art, and which are to be considered within the scope of the invention as defined by the following claims.

What is claimed is:

1. A commercial catalytic reforming process comprising the catalytic conversion of hydrocarbons to produce aromatics and hydrogen, said process comprising treating a halided zeolite catalyst containing a Group VIII metal at commercial startup conditions and then reforming hydrocarbons, wherein said catalyst is prepared by washing a bound zeolite catalyst base or a bound zeolite catalyst before halide addition.

2. A catalytic reforming process according to claim 1 wherein the halides of the halided zeolite catalyst comprise both chloride and fluoride.

3. A catalytic reforming process according to claim 1 wherein said halided zeolite catalyst comprises a halided platinum L-zeolite catalyst.

4. A catalytic reforming process according to claim 2 wherein ammonium halides are used to prepare the halided zeolite catalyst.

5. A catalytic reforming process according to claim 1 wherein said catalyst is prepared by a process that includes binding, extruding, calcining and washing the bound catalyst base before halide addition.

6. A catalytic reforming process according to claim 1 wherein said catalyst is produced by a method that includes the steps of:
   a) preparing a calcined silica-bound zeolite catalyst base;
   b) washing said bound zeolite catalyst base with a liquid comprising water; and
   c) incorporating a group VIII metal and halogen-containing compound(s) comprising chlorine and fluorine into said washed base to produce a halided zeolite catalyst.

7. A catalytic reforming process according to claim 6 wherein said catalyst base is prepared by forming an extrudate utilizing an extrusion aid in step (a) and further includes calcining the washed base of step (b) prior to incorporating the halogen-containing compound.

8. A catalytic reforming process according to claim 5, 6, or 7 wherein said halided zeolite catalyst comprises a halided platinum L-zeolite catalyst.

9. A catalytic reforming process according to claim 8 wherein said halided zeolite catalyst was prepared using ammonium chloride and fluoride.

10. A catalytic reforming process according to claim 1 wherein said process comprises contacting a hydrocarbon stream containing less than 50 ppb sulfur with said halided zeolite catalyst.

11. A catalytic reforming process according to claim 1 wherein a stream containing at least $C_6$ and $C_7$ hydrocarbons containing less than 50 ppb sulfur is contacted with a non-acidic Pt K L-zeolite catalyst comprising chloride and fluoride, said catalyst having been washed with water before halide addition.

12. A process for producing aromatics comprising preparing a halided zeolite catalyst by washing a calcined bound zeolite catalyst base with a liquid comprising water; adding at least one halogen-containing compound and a Group VIII metal compound to said washed base; bringing said catalyst on stream using commercial startup conditions; and contacting the catalyst with paraffinic hydrocarbons at catalytic reforming conditions to produce aromatics.

13. The process of claim 12 wherein the catalyst comprises both chloride and fluoride, and the zeolite is an L-zeolite.

14. A commercial hydrocarbon conversion process comprising the catalytic conversion of a hydrocarbon-containing feed to a product comprising aromatics, under conversion conditions that include a catalyst startup at a gas flow rate comprising a GHSV of between 400 and 2000 $hr^{-1}$ and a heat-up rate of between 5 and 50° F./hr during catalyst reduction above about 500° F., said process using a halided zeolite catalyst containing a Group VIII metal, said halided catalyst prepared by a process comprising washing a bound zeolite catalyst base or catalyst before halide addition.

15. A hydrocarbon conversion process according to claim 14 wherein the halides of the halide zeolite catalyst comprise both chloride and fluoride.

16. A hydrocarbon conversion process according to claim 14 wherein said halided zeolite catalyst was prepared using ammonium chloride and fluoride.

17. A hydrocarbon conversion process according to claim 14 wherein the gas flow rate comprises a GHSV of between 600 and 1500 $hr^{-1}$ and the heat-up rate is between 10 and 25° F./hr during catalyst reduction above about 500° F.

18. A hydrocarbon conversion process according to claim 14 wherein said halided catalyst has a total halide content of at least about 0.9 wt %.

19. A catalytic reforming process according to claim 1 wherein said halided zeolite catalyst comprises at least 0.9 wt % total halide.

20. A catalytic reforming process according to claim 1 wherein said process has a cycle length of at least 1200 hours.

21. A hydrocarbon conversion process according to claim 14 wherein said process has a cycle length of at least 1200 hours.

* * * * *